Sept. 18, 1923.
C. P. TOWNSEND
1,468,220
PRODUCING ORGANIC CHLORIN SUBSTITUTION PRODUCTS
Filed June 21, 1917
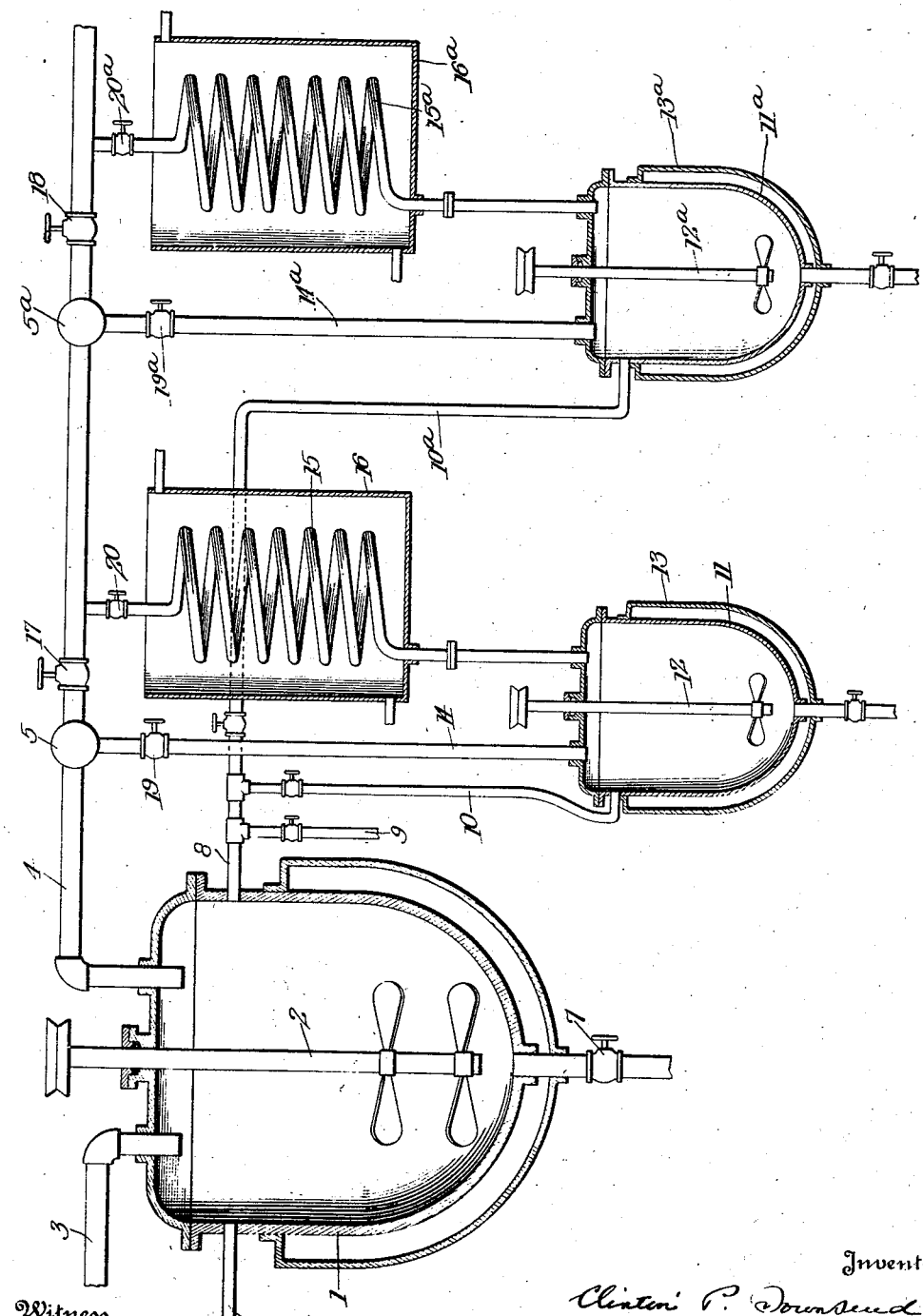

Patented Sept. 18, 1923.

1,468,220

UNITED STATES PATENT OFFICE.

CLINTON P. TOWNSEND, OF WASHINGTON, DISTRICT OF COLUMBIA, ASSIGNOR TO HOOKER ELECTROCHEMICAL COMPANY, OF NEW YORK, N. Y., A CORPORATION OF NEW YORK.

PRODUCING ORGANIC CHLORINE SUBSTITUTION PRODUCTS.

Application filed June 21, 1917. Serial No. 176,237.

*To all whom it may concern:*

Be it known that I, CLINTON PAUL TOWNSEND, a citizen of the United States, residing at Washington, in the District of Columbia, have invented certain new and useful Improvements in Producing Organic Chlorine Substitution Products, of which the following is a specification.

This invention relates to the manufacture of chlorine-substituted organic bodies. The preparation of the chlor-benzols by reacting upon benzol with chlorine is a typical reaction of this character, and the invention will be described by way of illustration as applied to this particular reaction, although it is applicable to the manufacture of other halogen-substituted organic bodies, both fatty and aromatic, and especially such as are more or less volatile at the preferred reacting temperature.

It is well known that benzol reacts directly with chlorine at moderate temperatures, yielding mono- and di-chlorbenzols in varying proportions, with gaseous hydrochloric acid as a by-product. This reaction is usually carried out under substantially anhydrous conditions, at a temperature somewhat above normal and in presence of a suitable catalyzer, for example anhydrous ferric chlorid. Gaseous hydrochloric acid is copiously evolved, and is found to carry from the chlorinating vessel or reaction zone very material quantities of benzol and its chlorination products. The amount of benzol thus removed from the reaction zone depends among other factors upon the temperature of the gas-stream. An incomplete recovery of benzol may therefore be secured by cooling or refrigerating the outflowing gas, the condensate either flowing back into the chlorinator or being separately withdrawn as may be preferred. A further slight recovery may be made when the hydrochloric acid is subsequently dissolved in water for the preparation of the commercial solution; but inasmuch as this reaction evolves heat and requires the use of large volumes of water the recoveries thus made in practice are not large.

According to the present invention a substantially complete recovery of benzol and its chlorination products may be made in case the chlorine used is undiluted by air, or in case the chlorine used is diluted by air, substantial but incomplete recoveries may be made. This is accomplished by passing the exit gases, carrying hydrochloric acid and benzol, with or without air, through or over a relatively small volume of a highly efficient absorber for hydrochloric acid. It is found in practice that the association between the hydrochloric acid gas and the benzol vapors contained in the effluent gas is of such nature that when the hydrochloric acid is caused to enter into chemical combination and is thereby withdrawn from the gas-stream, the benzol, together with any chlorination products of benzol which may be present, is precipitated in the liquid phase. Such precipitation occurs even when there is no reduction of temperature in the system, or even when there is an actual increase of temperature, which permits the hydrochloric acid to be combined at the most advantageous temperature for this purpose, which may be materially above the temperature of chlorination or of the stream of hydrochloric acid and benzol entering the recovery vessel, hereinafter referred to for convenience as the "scrubber." To avoid material losses of benzol by vaporization from the scrubber, the exit therefrom is connected to a cooled condenser, which may reflux into the scrubber or into a separate collector as desired.

Apparatus suitable for practicing the invention is diagrammatically illustrated in the accompanying drawing, wherein the figure is a vertical longitudinal section through a chlorinating vessel, and two scrubbers operating upon the effluent gases from the chlorinating vessel.

In said drawing, 1 represents the chlorinator, which may be of cast iron in case strictly anhydrous conditions are provided. As shown the chlorinator is a jacketed vessel provided with a mechanical agitator 2, a chlorine inlet 3, and an exit pipe 4 leading the vapors to a manifold 5. 6 represents the inlet for benzol, and 7 the valved discharge line for the chlorinated product. The chlorinator may operate either intermittently or continuously as desired, being provided in the latter case with a suitable overflow diagrammatically indicated at 8. This overflow may discharge through pipe 9 into the usual neutralizing system; or for a special purpose below described it may discharge through pipes 10, 10ª into either or both of the scrubbers 11, 11ª. Any desired type of chlorinator may be substituted for that shown in the drawing.

The scrubbers are represented at 11 and 11ª, and may consist of closed enameled steel or stoneware vessels, each provided with a mechanical agitator 12, 12ª. Means should be provided for controlling the temperature within the vessels, such means being indicated in the form of jackets 13, 13ª into which steam or water may be introduced. The scrubber 11 receives the exit gases from one or more chlorinators, according to its capacity, from the manifold 5 through the inlet pipe 14; and the exit gases from the scrubber escape through a condensing coil 15, illustrated as functioning as a reflux condenser. This coil may be cooled by water, refrigerated brine, etc., flowing through the cooling tank 16.

The scrubber 11ª is shown as having the same construction and provided with the same connections as described above, receiving its gas through inlet pipe 14ª from a manifold 5ª. Suitable pipe connections are provided, with their appropriate valves, whereby two or more scrubbers may be operated either in series or parallel in the line of gas-flow, or whereby any scrubber may be disconnected at will, for example for the purpose of discharging and re-charging. One simple mode of connecting the scrubbers so that the exit gases may be caused to pass through them in series is illustrated in the drawing, from which it will be apparent that when the valves 17 and 18 are closed, all other valves in the vapor line being open, the gases will flow successively through the scrubber 11 and its reflux 15, and through the scrubber 11ª and its reflux 15ª. If, however, for example, it is desired to disconnect the scrubber 11 without interfering with the operation of the scrubber 11ª, this is readily accomplished by opening the valve 17 and closing the valves 19 and 20, the gases thereupon flowing directly to the scrubber 11ª. The movement of the gases through the system may be accomplished in any usual manner, as for example, by supplying them under slight pressure to the chlorinator through the inlet pipe 3, or by the use of an exhaust fan at the exit end of the system. For absorbing the hydrochloric acid evolved in the chlorinator 1, it is preferred to use in the scrubbers either zinc oxid or manganese dioxid, the action and mode of use of the scrubbers being quite different in the two cases.

1. *Zinc oxid scrubber.*

Pure zinc oxid or roasted blende may be used. In either case the zinc oxid is suspended in an appropriate amount of water by mechanical stirring, the stream of hydrochloric acid carrying benzol being introduced either above or below the surface of the liquid, preferably the former in order to avoid pressure in the system. Hydrochloric acid is rapidly absorbed with evolution of heat, so that the vessel should be cooled to a suitable operating temperature, preferably about 40–60° C. In case air or other fixed gases are present they are permitted to escape through the reflux condenser 15, being there preferably cooled to 4–10° C. When the zinc oxid is completely or sufficiently converted into chlorid the gas-stream is diverted to another scrubber, any supernatant layer of benzol, together with any chlorination products, is drawn off, and the aqueous solution is withdrawn to be worked up for zinc chlorid in accordance with any approved method. Or if preferred, the entire contents of the scrubber may be subjected to steam distillation, which is particularly desirable in case the zinc oxid has been supplied in the form of a grade of roasted blende which yields material amounts of gelatinous silica with hydrochloric acid; since in such cases considerable amounts of benzol may be retained as an emulsion in the aqueous solution. Even when no apparent emulsification has occurred, it is well to inject steam into the aqueous solution of zinc chlorid before or during its concentration in order to eliminate traces of organic substances which might undergo dehydration or condensation during the concentration of the zinc chlorid, with resulting darkening of the solution or of the fused salt.

In case the flow of hydrochloric acid is diverted as soon as or before the zinc has been practically all dissolved, the aqueous solution of zinc chlorid will be found to be substantially free from iron. In case this is not done iron will be present in the solution and should be removed, in the ferric state, for example by adding the appropriate quantity of roasted blende. This is preferably done after any residual organic matter has been steamed off, and any ferrous iron which may be present has been converted into the ferric state by chlorine or other appropriate agent.

The benzol collected in this operation is dried and returned to the chlorinators.

The zinc oxid scrubber used as above is not very effective for the absorption of free chlorine from the exit gases, and no further material chlorination of the benzol occurs in the scrubber when aqueous suspensions of zinc oxid are used.

The reaction which takes place when a scrubber of this type is used in an exit line carrying hydrochloric acid and benzol may be thus expressed:—

(1) $ZnO + 2HCl + C_6H_6 \underset{\text{vapor phase}}{=} ZnCl_2 + H_2O + C_6H_6 \text{ (liquid phase)}$ In practice, sufficient water is used to produce with the zinc oxid a sufficiently fluid pulp, having due regard to the particular stirring means used. For illustration, the initial charge may comprise:—

|  | Parts by weight. |
|---|---|
| ZnO (high grade roasted blende) | 100 |
| Water | 300 |

The ore is preferably ground to say 60–100 mesh to facilitate the suspension and to present a large reacting surface.

2. *Manganese dioxid scrubber.*

The mode of operation of this type of scrubber is essentially different from that of the zinc oxid scrubber, owing to the fact that at the operating temperature, the manganese dioxid reacts with the hydrochloric acid to produce chlorine and manganese chlorid, as may be represented by the well known equation:—

(2) $MnO_2 + 4HCl = MnCl_2 + Cl_2 + 2H_2O$.

It is not certain however that in the operation as below described chlorine ever appears as such, since it is possible that the reactivity of the chlorine may be due to the formation and breaking down of a higher chlorination product of manganese presumably $MnCl_4$. However this may be, it has been found that chlorine generated under these conditions reacts with extreme readiness with benzol, even in presence of much water, the product formed consisting almost entirely of monochlorbenzol, $C_6H_5Cl$. In this respect, the chlorine acts quite differently from molecular chlorine which seems to require substantially anhydrous conditions for the best results in the commercial production of monochlorbenzol. The reaction between the chlorine and the benzol gives rise to further quantities of hydrochloric acid, which of course react further with manganese dioxid in accordance with equation (2) above. This formation of monochlorbenzol and hydrochloric acid may be thus represented:—

(3) $C_6H_6 + Cl_2 = C_6H_5Cl + HCl$.

Considering that the above two reactions, (2) and (3), are proceeding simultaneously in the same vessel, the result may conveniently be expressed in the form of a combined equation, as follows:—

(4) $C_6H_6 + MnO_2 + 3HCl = C_6H_5Cl + MnCl_2 + 2H_2O$.

In other words, if sufficient benzol be present a scrubber of this type is capable of taking up hydrochloric acid, yielding as valuable products monochlorbenzol and manganese chlorid. Since the quantity of benzol carried by the exit gases is usually less than is required for the efficient carrying out of this reaction, it is preferred to introduce into the scrubber at the beginning or in course of the operation, a certain quantity of benzol, or of light distillate from the monochlorbenzol fractionating stills, or of incompletely chlorinated benzol from the chlorinators. The amount of benzol thus introduced will of course depend upon the proportion of benzol carried by the hydrochloric acid stream entering the scrubber.

A scrubber of this type possesses the especial advantage that it is capable of absorbing not only hydrochloric acid gas, but gaseous chlorine as well. This arises from the fact that the reaction in the scrubber involves, on the one hand, the generation of chlorine by the action of hydrochloric acid on manganese dioxid (equation (2) above); and on the other hand, the generation of hydrochloric acid by the reaction of chlorine on benzol (equation (3) above). Hence the reaction will proceed in the same general way whether the scrubber receives hydrochloric acid alone, or chlorine alone, or any mixture of hydrochloric acid and chlorine. This fact not only renders this type of scrubber applicable to the treatment of exit gases carrying hydrochloric acid or chlorine or mixtures of the two; but it permits its use in connection with a primary source of supply of chlorine or of hydrochloric acid for the production of chlorbenzol. The operation proceeds in either case as above described, it being therefore broadly immaterial, so far as the final result is concerned, whether the gaseous reagent or chlorinating agent introduced is free chlorine or hydrochloric acid, both of which, as well as mixtures thereof are therefore included in the expression "chlorinating agent" as used in certain claims. Nevertheless, the proportion of the components entering into reaction differs decidedly in the two cases, as will be clear from the following equations representing respectively the combined reaction with hydrochloric acid and with chlorine:—

With hydrochloric acid—

(4) $C_6H_6 + MnO_2 + 3HCl = C_6H_5Cl + MnCl_2 + 2H_2O.$

With chlorine—

(5) $4C_6H_6 + MnO_2 + 6Cl = 4C_6H_5Cl + MnCl_2 + 2H_2O.$

In practice, the charges may in either case be prepared with an amount of benzol some 20–60 per cent in excess of the theoretical proportion to the manganese dioxid content of the ore, in order that the chlorination of the benzol may be incomplete, since under such conditions the proportionate yield of monochlorbenzol is at a maximum. The chlorinated hydrocarbon is then separated from the manganese chlorid solution, either by steam distillation or, in the absence of an emulsified condition, by decantation, and is carefully dried, for example by means of calcium chlorid. Following the usual practice, the monochlorbenzol is then separated by fractional distillation from the light distillate consisting largely of unconverted benzol, on the one hand, and from the high-boiling residue consisting largely of higher chlorination products, on the other hand. The light distillate is returned to the chlorinator with the necessary additions of incompletely chlorinated benzol or the like.

A representative charge for use in absorbing hydrochloric acid may comprise—

| | Parts by weight. |
|---|---|
| Benzol | 100 |
| Water | 200 |
| MnO$_2$ (80%) | 100 |

A representative charge for use with chlorine may comprise—

| | Parts by weight. |
|---|---|
| Benzol | 400 |
| Water or dilute hydrochloric acid | 400 |
| MnO$_2$ (80%) | 100 |

In either case, it is preferred that the manganese dioxid should be mixed with and thoroughly wetted by the water before the benzol is added. The above proportions may be widely varied according to the efficiency of the stirring, the degree of chlorination desired, etc.

While such mixtures of manganese dioxid, benzol and water are capable as above pointed out of absorbing both chlorine and hydrochloric acid, or either of these alone, producing in either case monochlorbenzol and manganese chlorid, it is not to be inferred that the action in the two cases is absolutely identical. As a matter of fact, experience has shown that the use of hydrochloric acid tends to give higher proportionate yields of monochlorbenzol than does chlorine, the latter usually at least giving a somewhat larger proportion of higher chlorination products, probably a mixture of dichlorbenzols.

I claim:—

1. In a process of producing chlorine-substitution products of organic bodies, the step which consists in suspending a reactive metal oxid in an aqueous liquid, and leading into contact therewith a gas-mixture containing a hydrocarbon vapor and a chloridizing agent.

2. In a process of producing chlorine-substitution products of organic bodies, the step which consists in suspending a reactive metal oxid in an aqueous liquid, and leading into contact therewith a gas-mixture containing a hydrocarbon vapor and hydrochloric acid.

3. In a process of producing chlorine-substitution products of organic bodies, the step which consists in suspending manganese dioxid in an aqueous liquid, and leading into contact therewith a gas-mixture containing a hydrocarbon vapor and a chloridizing agent.

4. In a process of producing chlorine-substitution products of organic bodies, the step which consists in suspending manganese dioxid in an aqueous liquid, and leading into contact therewith a gas-mixture containing a hydrocarbon vapor and hydrochloric acid.

5. The method of producing chlorine-substitution products of organic bodies, which consists in mechanically suspending the organic body and manganese dioxid in an aqueous liquid, and supplying a chloridizing agent to said suspension.

6. The method of producing chlorine-substitution products of organic bodies, which consists in mechanically suspending the organic body and manganese dioxid in an aqueous liquid, and supplying gaseous hydrochloric acid to said suspension.

7. In a process of making chlorine-substitution compounds of organic bodies, the steps which consist in effecting a reaction between manganese dioxid and hydrochloric acid with production of chlorine and manganese chlorid, and causing the chlorine to react the moment of its formation with an organic body yielding a chlorine-substitution product and hydrochloric acid, thereby supplying additional hydrochloric acid for the initial reaction.

8. The method of producing chlorine-substitution products of organic bodies capable of yielding a chlorine-substitution product and hydrochloric acid, which consists in chlorinating said body in presence of manganese dioxid, forming thereby a chlorine substitution product and hydrochloric acid.

9. In a process of treating gases containing a chlorinating agent and hydrocarbon vapors, the step which consists in removing the chlorinating agent from the gas-stream by converting it into a metallic chlorid, with simultaneous conversion of the hydrocarbon to the liquid phase.

10. In a process of treating gases containing hydrochloric acid and hydrocarbon vapors, the steps which consist in removing the hydrochloric acid from the gas-stream by converting it into a metal chlorid with simultaneous conversion of the hydrocarbon to the liquid phase, and then separating the hydrocarbon from the metal chlorid.

11. In a process of recovering hydrocarbons from chlorinator-exit gases carrying also hydrochloric acid, the steps which consist in bringing the hydrochloric acid into the presence of a reactive metallic oxid in aqueous suspension, while converting the associated hydrocarbon vapors into the liquid phase, and separating the hydrocarbon from the resulting metal chlorid solution.

In testimony whereof I affix my signature.

CLINTON P. TOWNSEND.